United States Patent
Cavaliere et al.

(10) Patent No.: US 10,432,316 B2
(45) Date of Patent: Oct. 1, 2019

(54) METHOD OF TRANSMITTING COMMUNICATIONS TRAFFIC, TRANSMITTER AND COMMUNICATIONS TRANSMISSION SYSTEM

(71) Applicant: TELEFONAKTIEBOLAGET LM ERICSSON (PUBL), Stockholm (SE)

(72) Inventors: Fabio Cavaliere, Pisa (IT); Antonio Malacarne, Pisa (IT); Enrico Forestieri, Pisa (IT); Marco Secondini, Pisa (IT); Luca Poti, Pisa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/758,112

(22) PCT Filed: Sep. 8, 2015

(86) PCT No.: PCT/EP2015/070494
§ 371 (c)(1),
(2) Date: Mar. 7, 2018

(87) PCT Pub. No.: WO2017/041829
PCT Pub. Date: Mar. 16, 2017

(65) Prior Publication Data
US 2018/0254833 A1 Sep. 6, 2018

(51) Int. Cl.
*H04B 10/00* (2013.01)
*H04B 10/556* (2013.01)
*H04B 10/516* (2013.01)
*H04J 14/04* (2006.01)
(Continued)

(52) U.S. Cl.
CPC ......... *H04B 10/5563* (2013.01); *H04B 10/25* (2013.01); *H04B 10/503* (2013.01); *H04B 10/516* (2013.01); *H04J 14/04* (2013.01)

(58) Field of Classification Search
USPC .................................................. 398/182–201
See application file for complete search history.

(56) References Cited

U.S. PATENT DOCUMENTS

| | | | |
|---|---|---|---|
| 2012/0177065 A1* | 7/2012 | Winzer | H04B 10/2581 370/480 |
| 2014/0314410 A1* | 10/2014 | Mumtaz | H04B 10/2581 398/65 |
| 2018/0254833 A1* | 9/2018 | Cavaliere | H04B 10/516 |

FOREIGN PATENT DOCUMENTS

| | | |
|---|---|---|
| EP | 2273702 A1 | 1/2011 |
| WO | 2014204005 A1 | 12/2014 |

OTHER PUBLICATIONS

International Search Report and Written Opinion dated Jun. 6, 2016 in related International Application No. PCT/EP2015/070494.

* cited by examiner

*Primary Examiner* — Agustin Bello
(74) *Attorney, Agent, or Firm* — Sage Patent Group

(57) ABSTRACT

A method of transmitting communications traffic, the method comprising steps of receiving a sequence of communications traffic bits; and mapping the sequence of communications traffic bits onto a respective one of a plurality of transmission symbols for transmission during a symbol time. Each transmission symbol is identified by a respective first symbol identifier indicative of a respective one or more of a plurality, M, of wavelengths for a transmission signal and a respective second symbol identifier indicative of a respective one or more of a plurality, N, of optical fibers on which to transmit the transmission signal.

12 Claims, 11 Drawing Sheets

(51) Int. Cl.
*H04B 10/25* (2013.01)
*H04B 10/50* (2013.01)

| Received bits | Transmission Symbol | Laser to warm-up |
|---|---|---|
| 00000000 | (B,1) | |
| 00000001 | (G,1) | (B,1) |
| 00000010 | (Y,1) | (B,1) |
| 00000011 | (R,1) | (B,1) |
| 00000100 | (B,2) | (B,1) |
| 00000101 | (G,2) | (B,1) |
| 00000110 | (Y,2) | (B,1) |
| 00000111 | (R,2) | (B,1) |
| 00001000 | (B,3) | (B,1) |
| 00001001 | (G,3) | (B,1) |
| 00001010 | (Y,3) | (B,1) |
| 00001011 | (R,3) | (B,1) |
| 00001100 | (B,4) | (B,1) |
| 00001101 | (G,4) | (B,1) |
| 00001110 | (Y,4) | (B,1) |
| 00001111 | (R,4) | (B,1) |
| 00010000 | (B,1) | (G,1) |
| 00010001 | (G,1) | |
| 00010010 | (Y,1) | (G,1) |
| 00010011 | (R,1) | (G,1) |
| 00010100 | (B,2) | (G,1) |
| 00010101 | (G,2) | (G,1) |
| 00010110 | (Y,2) | (G,1) |
| 00010111 | (R,2) | (G,1) |
| 00011000 | (B,3) | (G,1) |
| 00011001 | (G,3) | (G,1) |
| 00011010 | (Y,3) | (G,1) |
| 00011011 | (R,3) | (G,1) |
| 00011100 | (B,4) | (G,1) |
| 00011101 | (G,4) | (G,1) |
| 00011110 | (Y,4) | (G,1) |
| 00011111 | (R,4) | (G,1) |
| 00100000 | (B,1) | (Y,1) |
| 00100001 | (G,1) | (Y,1) |
| 00100010 | (Y,1) | |
| 00100011 | (R,1) | (Y,1) |
| 00100100 | (B,2) | (Y,1) |
| 00100101 | (G,2) | (Y,1) |
| 00100110 | (Y,2) | (Y,1) |
| 00100111 | (R,2) | (Y,1) |
| 00101000 | (B,3) | (Y,1) |
| 00101001 | (G,3) | (Y,1) |
| 00101010 | (Y,3) | (Y,1) |
| 00101011 | (R,3) | (Y,1) |
| 00101100 | (B,4) | (Y,1) |

Fig. 7

| | | |
|---|---|---|
| 00101101 | (G,4) | (Y,1) |
| 00101110 | (Y,4) | (Y,1) |
| 00101111 | (R,4) | (Y,1) |
| 00110000 | (B,1) | (R,1) |
| 00110001 | (G,1) | (R,1) |
| 00110010 | (Y,1) | (R,1) |
| 00110011 | (R,1) | |
| 00110100 | (B,2) | (R,1) |
| 00110101 | (G,2) | (R,1) |
| 00110110 | (Y,2) | (R,1) |
| 00110111 | (R,2) | (R,1) |
| 00111000 | (B,3) | (R,1) |
| 00111001 | (G,3) | (R,1) |
| 00111010 | (Y,3) | (R,1) |
| 00111011 | (R,3) | (R,1) |
| 00111100 | (B,4) | (R,1) |
| 00111101 | (G,4) | (R,1) |
| 00111110 | (Y,4) | (R,1) |
| 00111111 | (R,4) | (R,1) |
| 01000000 | (B,1) | (B,2) |
| 01000001 | (G,1) | (B,2) |
| 01000010 | (Y,1) | (B,2) |
| 01000011 | (R,1) | (B,2) |
| 01000100 | (B,2) | |
| 01000101 | (G,2) | (B,2) |
| 01000110 | (Y,2) | (B,2) |
| 01000111 | (R,2) | (B,2) |
| 01001000 | (B,3) | (B,2) |
| 01001001 | (G,3) | (B,2) |
| 01001010 | (Y,3) | (B,2) |
| 01001011 | (R,3) | (B,2) |
| 01001100 | (B,4) | (B,2) |
| 01001101 | (G,4) | (B,2) |
| 01001110 | (Y,4) | (B,2) |
| 01001111 | (R,4) | (B,2) |
| 01010000 | (B,1) | (G,2) |
| 01010001 | (G,1) | (G,2) |
| 01010010 | (Y,1) | (G,2) |
| 01010011 | (R,1) | (G,2) |
| 01010100 | (B,2) | (G,2) |
| 01010101 | (G,2) | |
| 01010110 | (Y,2) | (G,2) |
| 01010111 | (R,2) | (G,2) |
| 01011000 | (B,3) | (G,2) |
| 01011001 | (G,3) | (G,2) |
| 01011010 | (Y,3) | (G,2) |

Fig. 7
(continued)

| | | |
|---|---|---|
| 01011011 | (R,3) | (G,2) |
| 01011100 | (B,4) | (G,2) |
| 01011101 | (G,4) | (G,2) |
| 01011110 | (Y,4) | (G,2) |
| 01011111 | (R,4) | (G,2) |
| 01100000 | (B,1) | (Y,2) |
| 01100001 | (G,1) | (Y,2) |
| 01100010 | (Y,1) | (Y,2) |
| 01100011 | (R,1) | (Y,2) |
| 01100100 | (B,2) | (Y,2) |
| 01100101 | (G,2) | (Y,2) |
| 01100110 | (Y,2) | |
| 01100111 | (R,2) | (Y,2) |
| 01101000 | (B,3) | (Y,2) |
| 01101001 | (G,3) | (Y,2) |
| 01101010 | (Y,3) | (Y,2) |
| 01101011 | (R,3) | (Y,2) |
| 01101100 | (B,4) | (Y,2) |
| 01101101 | (G,4) | (Y,2) |
| 01101110 | (Y,4) | (Y,2) |
| 01101111 | (R,4) | (Y,2) |
| 01110000 | (B,1) | (R,2) |
| 01110001 | (G,1) | (R,2) |
| 01110010 | (Y,1) | (R,2) |
| 01110011 | (R,1) | (R,2) |
| 01110100 | (B,2) | (R,2) |
| 01110101 | (G,2) | (R,2) |
| 01110110 | (Y,2) | (R,2) |
| 01110111 | (R,2) | |
| 01111000 | (B,3) | (R,2) |
| 01111001 | (G,3) | (R,2) |
| 01111010 | (Y,3) | (R,2) |
| 01111011 | (R,3) | (R,2) |
| 01111100 | (B,4) | (R,2) |
| 01111101 | (G,4) | (R,2) |
| 01111110 | (Y,4) | (R,2) |
| 01111111 | (R,4) | (R,2) |
| 10000000 | (B,1) | (B,3) |
| 10000001 | (G,1) | (B,3) |
| 10000010 | (Y,1) | (B,3) |
| 10000011 | (R,1) | (B,3) |
| 10000100 | (B,2) | (B,3) |
| 10000101 | (G,2) | (B,3) |
| 10000110 | (Y,2) | (B,3) |
| 10000111 | (R,2) | (B,3) |
| 10001000 | (B,3) | |

Fig. 7
(continued)

| | | |
|---|---|---|
| 10001001 | (G,3) | (B,3) |
| 10001010 | (Y,3) | (B,3) |
| 10001011 | (R,3) | (B,3) |
| 10001100 | (B,4) | (B,3) |
| 10001101 | (G,4) | (B,3) |
| 10001110 | (Y,4) | (B,3) |
| 10001111 | (R,4) | (B,3) |
| 10010000 | (B,1) | (G,3) |
| 10010001 | (G,1) | (G,3) |
| 10010010 | (Y,1) | (G,3) |
| 10010011 | (R,1) | (G,3) |
| 10010100 | (B,2) | (G,3) |
| 10010101 | (G,2) | (G,3) |
| 10010110 | (Y,2) | (G,3) |
| 10010111 | (R,2) | (G,3) |
| 10011000 | (B,3) | (G,3) |
| 10011001 | (G,3) | |
| 10011010 | (Y,3) | (G,3) |
| 10011011 | (R,3) | (G,3) |
| 10011100 | (B,4) | (G,3) |
| 10011101 | (G,4) | (G,3) |
| 10011110 | (Y,4) | (G,3) |
| 10011111 | (R,4) | (G,3) |
| 10100000 | (B,1) | (Y,3) |
| 10100001 | (G,1) | (Y,3) |
| 10100010 | (Y,1) | (Y,3) |
| 10100011 | (R,1) | (Y,3) |
| 10100100 | (B,2) | (Y,3) |
| 10100101 | (G,2) | (Y,3) |
| 10100110 | (Y,2) | (Y,3) |
| 10100111 | (R,2) | (Y,3) |
| 10101000 | (B,3) | (Y,3) |
| 10101001 | (G,3) | (Y,3) |
| 10101010 | (Y,3) | |
| 10101011 | (R,3) | (Y,3) |
| 10101100 | (B,4) | (Y,3) |
| 10101101 | (G,4) | (Y,3) |
| 10101110 | (Y,4) | (Y,3) |
| 10101111 | (R,4) | (Y,3) |
| 10110000 | (B,1) | (R,3) |
| 10110001 | (G,1) | (R,3) |
| 10110010 | (Y,1) | (R,3) |
| 10110011 | (R,1) | (R,3) |
| 10110100 | (B,2) | (R,3) |
| 10110101 | (G,2) | (R,3) |
| 10110110 | (Y,2) | (R,3) |

Fig. 7
(continued)

| | | |
|---|---|---|
| 10110111 | (R,2) | (R,3) |
| 10111000 | (B,3) | (R,3) |
| 10111001 | (G,3) | (R,3) |
| 10111010 | (Y,3) | (R,3) |
| 10111011 | (R,3) | |
| 10111100 | (B,4) | (R,3) |
| 10111101 | (G,4) | (R,3) |
| 10111110 | (Y,4) | (R,3) |
| 10111111 | (R,4) | (R,3) |
| 11000000 | (B,1) | (B,4) |
| 11000001 | (G,1) | (B,4) |
| 11000010 | (Y,1) | (B,4) |
| 11000011 | (R,1) | (B,4) |
| 11000100 | (B,2) | (B,4) |
| 11000101 | (G,2) | (B,4) |
| 11000110 | (Y,2) | (B,4) |
| 11000111 | (R,2) | (B,4) |
| 11001000 | (B,3) | (B,4) |
| 11001001 | (G,3) | (B,4) |
| 11001010 | (Y,3) | (B,4) |
| 11001011 | (R,3) | (B,4) |
| 11001100 | (B,4) | |
| 11001101 | (G,4) | (B,4) |
| 11001110 | (Y,4) | (B,4) |
| 11001111 | (R,4) | (B,4) |
| 11010000 | (B,1) | (G,4) |
| 11010001 | (G,1) | (G,4) |
| 11010010 | (Y,1) | (G,4) |
| 11010011 | (R,1) | (G,4) |
| 11010100 | (B,2) | (G,4) |
| 11010101 | (G,2) | (G,4) |
| 11010110 | (Y,2) | (G,4) |
| 11010111 | (R,2) | (G,4) |
| 11011000 | (B,3) | (G,4) |
| 11011001 | (G,3) | (G,4) |
| 11011010 | (Y,3) | (G,4) |
| 11011011 | (R,3) | (G,4) |
| 11011100 | (B,4) | (G,4) |
| 11011101 | (G,4) | |
| 11011110 | (Y,4) | (G,4) |
| 11011111 | (R,4) | (G,4) |
| 11100000 | (B,1) | (Y,4) |
| 11100001 | (G,1) | (Y,4) |
| 11100010 | (Y,1) | (Y,4) |
| 11100011 | (R,1) | (Y,4) |
| 11100100 | (B,2) | (Y,4) |

Fig. 7
(continued)

| Received bits | | Optical Power | | | |
|---|---|---|---|---|---|
| | | B | G | Y | R |
| 0 | 0 | 1 | 0 | 0 | 0 |
| 0 | 1 | 0 | 1 | 0 | 0 |
| 1 | 0 | 0 | 0 | 1 | 0 |
| 1 | 1 | 0 | 0 | 0 | 1 |

| Received bits | | | | Optical Power | | | |
|---|---|---|---|---|---|---|---|
| | | | | B | G | Y | R |
| 0 | 0 | 0 | 0 | 1 | 0 | 0 | 0 |
| 0 | 0 | 0 | 1 | $\alpha$ | 1 | 0 | 0 |
| 0 | 0 | 1 | 0 | $\alpha$ | 0 | 1 | 0 |
| 0 | 0 | 1 | 1 | $\alpha$ | 0 | 0 | 1 |
| 0 | 1 | 0 | 0 | 1 | $\alpha$ | 0 | 0 |
| 0 | 1 | 0 | 1 | 0 | 1 | 0 | 0 |
| 0 | 1 | 1 | 0 | 0 | $\alpha$ | 1 | 0 |
| 0 | 1 | 1 | 1 | 0 | $\alpha$ | 0 | 1 |
| 1 | 0 | 0 | 0 | 1 | 0 | $\alpha$ | 0 |
| 1 | 0 | 0 | 1 | 0 | 1 | $\alpha$ | 0 |
| 1 | 0 | 1 | 0 | 0 | 0 | 1 | 0 |
| 1 | 0 | 1 | 1 | 0 | 0 | $\alpha$ | 1 |
| 1 | 1 | 0 | 0 | 1 | 0 | 0 | $\alpha$ |
| 1 | 1 | 0 | 1 | 0 | 1 | 0 | $\alpha$ |
| 1 | 1 | 1 | 0 | 0 | 0 | 1 | $\alpha$ |
| 1 | 1 | 1 | 1 | 0 | 0 | 0 | 1 |

Fig. 10

METHOD OF TRANSMITTING COMMUNICATIONS TRAFFIC, TRANSMITTER AND COMMUNICATIONS TRANSMISSION SYSTEM

TECHNICAL FIELD

The disclosure relates to a method of transmitting communications traffic. The method further relates to an optical transmitter and to an optical communications transmission system comprising the optical transmitter.

BACKGROUND

Research and standardization are both very active in defining new modulation formats and technologies for 100 G and 400 G short reach optical interconnection interfaces, having a reach of up to 2 km. Applications for short reach optical interconnections include intra data centre fibre links and connections to radio units for massive MIMO, multiple input multiple output, or beamforming. The design guidelines for short reach optical interconnection interfaces are very different from those that guide the design of optical transport line cards, with energy efficiency, low cost and low latency replacing spectral efficiency and distance as the main design criteria. Current interconnection solutions for 100 Gbit/s data rates include 4×25 GBit/s coarse wavelength division multiplexing, CWDM, 4×25 Gbit/s over parallel fibres, known as parallel single mode 4 lane, PSM4, pulse amplitude modulation, PAM-4, and discrete multi-tone, DMT.

These solutions provide only a partial answer to the demand for high interconnection speeds, high energy efficiency or a combination of both. The current technology limits the number of optical components that can be integrated in a single chip. For example, CWDM4 and PSM4 rely on four 25 Gbit/s transmitters to achieve an aggregate rate of 100 Gbit/s. To increase the bit rate further would require the use of a multi-level modulation format to overcome transmitter and receiver bandwidth limitations. However, multi-level modulation formats, like DMT and PAM-4, require the use of both digital signal process, DSP, which dissipates power, and forward error correction, FEC, which introduces latency.

More energy efficient, but less spectrally efficient, modulation formats, such as pulse position modulation, PPM, and frequency shift keying, FSK, exist and are used when the energy per transmitted bit needs to be minimized and the propagation medium does not introduce significant bandwidth limitation, such as in free-space communications. In principle, these modulation formats could also be used for interconnection links over dedicated fibre but so far their application has been limited by the high transmitter cost; for example, many lasers are needed for FSK generation.

SUMMARY

It is an object to provide an improved method of transmitting communications traffic. It is a further object to provide an improved optical transmitter. It is a further object to provide an improved optical communications transmission system.

A first aspect of the disclosure provides a method of transmitting communications traffic, the method comprising a step of receiving a sequence of communications traffic bits. The method further comprises a step of mapping the sequence of communications traffic bits onto a respective one of a plurality of transmission symbols for transmission during a symbol time. Each transmission symbol is identified by a respective first symbol identifier indicative of a respective one or more of a plurality, M, of wavelengths for a transmission signal and a respective second symbol identifier indicative of a respective one or more of a plurality, N, of optical fibres on which to transmit the transmission signal.

The method may provide a high transmission speed with simple electronic post processing.

A second aspect of the disclosure provides an optical transmitter comprising an optical generator configured for generation of a transmission signal at a respective one of a plurality, M, of wavelengths and a plurality, N, of optical outputs. The transmitter further comprises an encoder configured to receive a sequence of communications traffic bits and configured to map the sequence of communications traffic bits onto one of a plurality of transmission symbols for transmission during a symbol time. Each transmission symbol is identified by a respective first symbol identifier indicative of a respective one or more of the plurality, M, of wavelengths at which to generate a transmission signal and a respective second symbol identifier indicative of a respective one or more of the plurality, N, of optical outputs from which to output the transmission signal.

A third aspect of the disclosure provides an optical communications transmission system comprising an optical transmitter, an optical receiver and a plurality, N, of optical fibres. The optical transmitter is as described in any example. The optical receiver comprises a decoder configured to receive each said transmission symbol. Each fibre is coupled between a respective one of the optical outputs of the optical transmitter and the optical receiver.

A fourth aspect of the disclosure provides a computer program, comprising instructions which, when executed on at least one processor, cause the at least one processor to carry out any of the above steps of the method of transmitting communications traffic.

BRIEF DESCRIPTION OF THE DRAWINGS

Embodiments of the disclosure will now be described, by way of example only, with reference to the accompanying drawings.

FIG. 7 illustrates, for the encoder of the optical transmitter of FIG. 6, mapping of bits sequences into a transmission symbol for transmission during a first symbol time and a laser to warm up during the first symbol time, for transmission of a transmission symbol during a second symbol time, following the first symbol time;

FIG. 10 illustrates, for each encoder of the optical transmitter of FIG. 8, mapping of bits sequences into a transmission symbol for transmission during a first symbol time and a laser to warm up during the first symbol time, for transmission of a transmission symbol during a second symbol time, following the first symbol time.

DETAILED DESCRIPTION

The same reference numbers will used for corresponding features in different embodiments.

Figure 1:
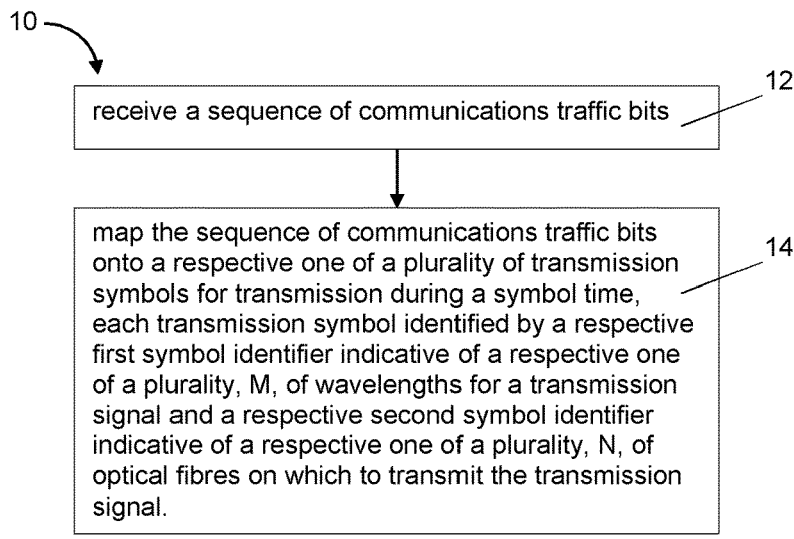
FIG. 1 shows the steps of a method according to an embodiment of the disclosure of transmitting communications traffic.

Referring to FIG. 1, an embodiment of the disclosure provides a method 10 of transmitting communications traffic.

The method comprises steps a. and b. as follows:

a. receiving a sequence of communications traffic bits 12; and b. mapping the sequence of communications traffic bits onto a respective one of a plurality of transmission symbols for transmission during a symbol time 14.

Each transmission symbol is identified by a respective first symbol identifier indicative of a respective one of a plurality, M, of wavelengths for a transmission signal and a respective second symbol identifier indicative of a respective one of a plurality, N, of optical fibres on which to transmit the transmission signal. The selection of one of a plurality of wavelengths provides for Frequency Shift Keying of the transmission.

Figure 2:
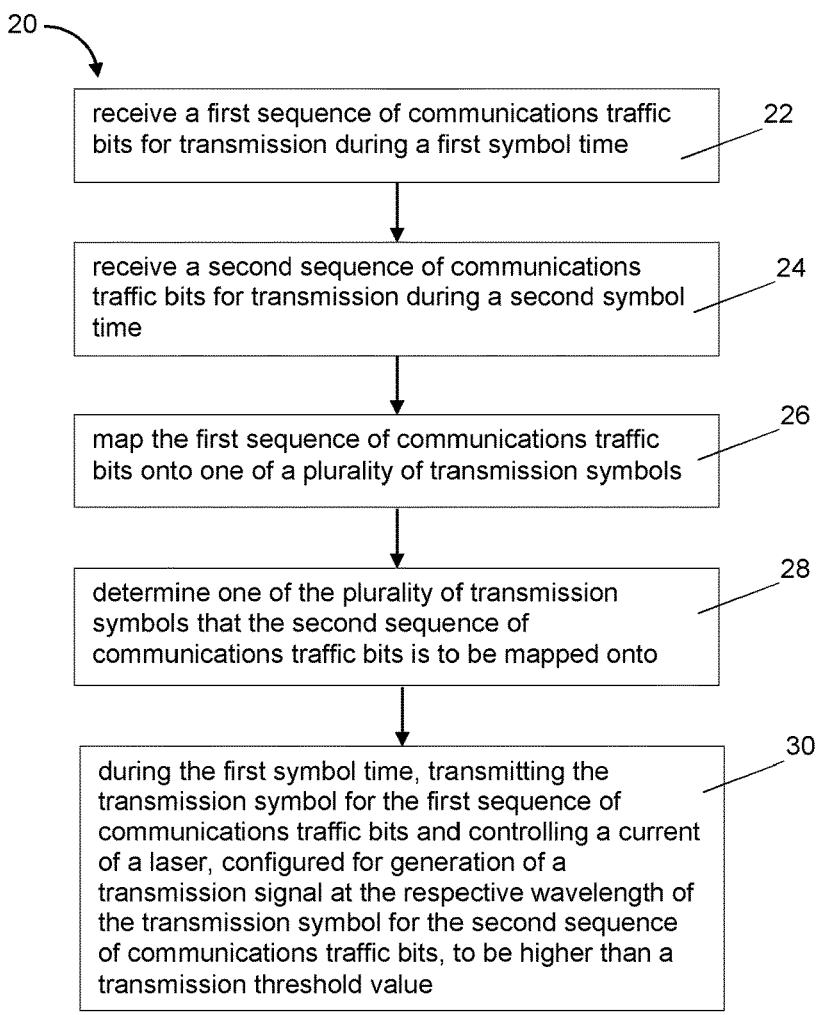
FIG. 2 shows the steps of a method according to an embodiment of the disclosure of transmitting communications traffic.

Referring to FIG. 2, an embodiment of the disclosure provides a method 20 of transmitting communications traffic.

The method comprises steps a. to c. as follows.

Step a. comprises receiving a first sequence of communications traffic bits for transmission during a first symbol time 22. Step a. further comprises receiving a second sequence of communications traffic bits for transmission during a second symbol time 24. The second symbol time is after the first symbol time.

Step b. comprises mapping the first sequence of communications traffic bits onto one of the plurality of transmission symbols 26. Step b. also comprises determining one of the plurality of transmission symbols that the second sequence of communications traffic bits is to be mapped onto 28.

Step c. comprises, during the first symbol time, transmitting the transmission symbol for the first sequence of communications traffic bits. Step c. also comprises, during the first symbol time, controlling a laser to prepare or 'warm-up' for generation of a transmission signal at the respective wavelength of the transmission symbol for the second sequence of communications traffic bits 30. For example, to prepare the laser for transmission in the second symbol time, the laser current is controlled to be higher than a transmission threshold value. The laser is prepared during transmission of the first symbol.

In an embodiment, step a. additionally comprises storing the received first and second sequences of communications traffic bits. The current may be a bias current of the laser.

Using an alphabet of T transmission symbols it is possible to map a sequence of $L=\log_2(T)$ bits into one symbol. Storing a longer sequence 2.L bits, i.e. storing the first and second sequences of communications traffic bits, it is possible to determine in advance which symbol is to be transmitted during the next symbol time and it is therefore possible to forecast which wavelength will be used for the next transmission symbol. This makes possible to turn-on in advance the current of the corresponding laser, for example, just above its transmission threshold. This allows for significantly decreasing the pulse rise time (which depends on the current) and increasing the achievable transmission speed. The drawback is the introduction of inter-symbol interference that, however, can be either tolerated as a penalty or removed by equalization.

Figure 3:
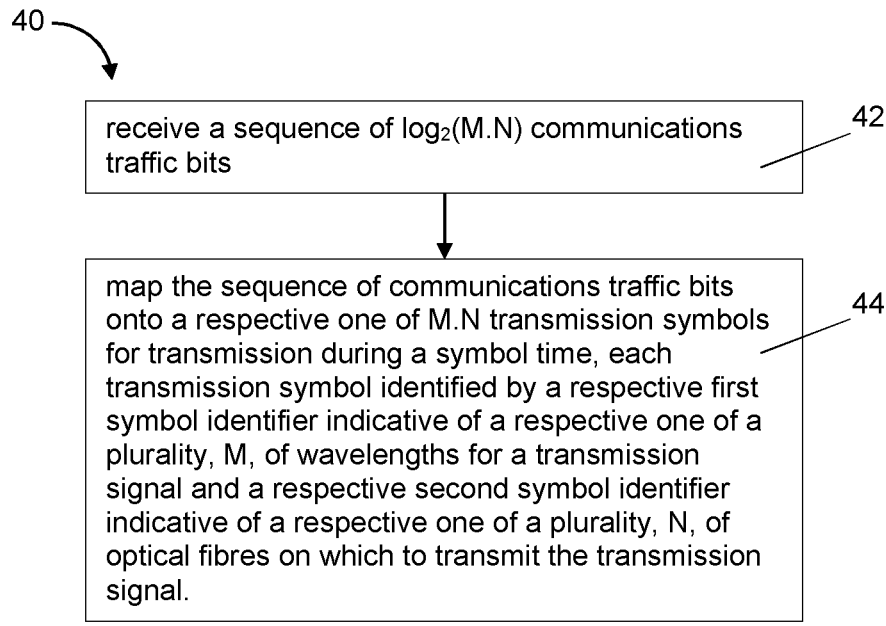
FIG. 3 shows the steps of a method according to an embodiment of the disclosure of transmitting communications traffic.

In an embodiment, described with reference to FIG. 3, each sequence of communications traffic bits consists of $\log_2(M.N)$ communications traffic bits and the plurality of transmission symbols consists of M.N transmission symbols.

The method 40 of this embodiment comprises steps a. and b., as follows:

a. receiving a sequence of $\log_2(M.N)$ communications traffic bits 42; and b. mapping the sequence of communications traffic bits onto a respective one of M.N transmission symbols for transmission during a symbol time 44.

Each transmission symbol is identified by a respective first symbol identifier indicative of a respective one of a plurality, M, of wavelengths for a transmission signal and a respective second symbol identifier indicative of a respective one of a plurality, N, of optical fibres on which to transmit the transmission signal. In this example, the transmission symbol is indicated by only one of the plurality of wavelengths. The transmission symbol uses Frequency Shift Keying.

In some examples, a transmission symbol is carried on only one of the plurality of optical fibers in any symbol period. In this case, the only symbol carried by the plurality of optical fibers is indicated only by a single wavelength and a single optical fiber. The transmission symbol may be the only transmission symbols transmitted on the plurality of optical fiber. The plurality of fibers and plurality of wavelengths may be considered as providing for a plurality of symbols forming a single set of symbols. In this case, the traffic bit encoding determines both the wavelength and the fiber. Thus, different sequences of the traffic bits are associated with symbols identified by different wavelengths and different sequences of the traffic bits are associated with symbols identified by different optical fibers. Both the wavelength and fiber are required to uniquely identify, i.e. decode, the sequence of traffic bits. Thus, the sequence of traffic bits is uniquely encoded using both a particular one or more wavelength and particular one or more optical fiber. The transmission of FSK symbols is not independent on each optical fiber. Instead, the selection of the optical fiber itself identifies the symbol, and hence identifies associated transmission data bits.

In some aspects, the sequence of communications traffic bits directly determines the wavelength and optical fiber of the transmission symbol. Thus, a same sequence will not be encoded as a same wavelength on any optical fiber. The mapping of each sequence is to a predetermined wavelength and a predetermined optical fiber.

In some examples, the mapping of a sequence comprises encoding a sequence by determining a symbol having a predetermined wavelength and a predetermined optical fiber. Each different sequence is associated with a predetermined different combination of wavelength and optical fiber.

In some cases, a particular optical fiber is used to transmit only a part or subset of the symbols. Alternatively, as described below, the symbol may be one of a plurality of transmission symbols, each transmitted on a respective optical fiber.

It is known from the information theory that in a communication system with an alphabet of T equi-probable orthogonal transmission signals, the energy per transmitted information unit decreases when T increases, meaning that the receiver has to operate at a lower signal-to-noise ratio.

In information theory, signals can be orthogonal in space, time or frequency domains. Frequency shift keying, FSK, is an example of orthogonal signalling, where M transmission frequencies can be generated and transmitted in an optical fibre using M independent lasers. Spatial Shift Keying, SSK, is another example, where N symbols are transmitted over N individual fibres. The two modulation formats are combined in the present method to transmit M.N orthogonal symbols, corresponding to $\log_2(M.N)$ information bits per symbol time.

An embodiment of the disclosure provides a method of transmitting communications traffic that is similar to the method 20 described above with reference to FIG. 2, with the following modifications: each sequence of communications traffic bits consists of $\log_2(M.N)$ communications traffic bits; and the plurality of transmission symbols consists of M.N transmission symbols.

Figure 4:
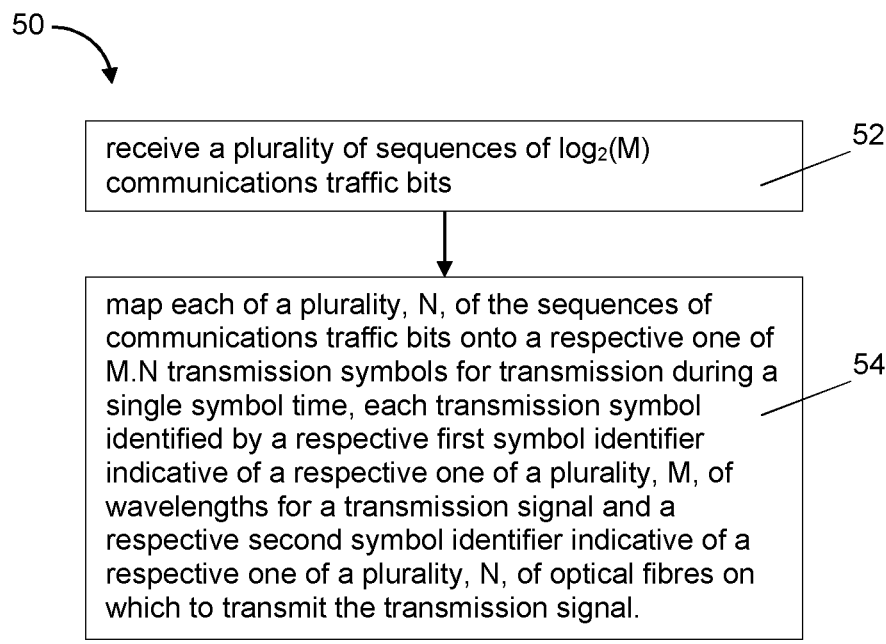
FIG. 4 shows the steps of a method according to an embodiment of the disclosure of transmitting communications traffic.

Referring to FIG. 4, an embodiment of the disclosure provides a method 50 of transmitting communications traffic.

The method comprises steps a. and b., as follows:

a. receiving a plurality of sequences of $\log_2(M)$ communications traffic bits 52; and b. mapping each of a plurality, N, of the sequences of communications traffic bits onto a respective one of a plurality M.N transmission symbols for transmission during a single symbol time 54.

Each transmission symbol is identified by a respective first symbol identifier indicative of a respective one of a plurality, M, of wavelengths for a transmission signal and a respective second symbol identifier indicative of a respective one of a plurality, N, of optical fibres on which to transmit the transmission signal.

As noted above, signals can be orthogonal in space, time or frequency domains. The method uses Frequency shift keying, FSK, as an example of orthogonal signalling, where M transmission frequencies can be generated and transmitted in an optical fibre using M independent lasers. Spatial Shift Keying, SSK, is another example, where N symbols are transmitted over N individual fibres. The two modulation formats may be combined to transmit M.N orthogonal symbols, corresponding to $\log_2(M.N)$ information bits per symbol time. Using the same physical implementation, it is possible to transmit N independent FSK signals, i.e. $N.\log_2(M)$ information bits per symbol time. Thus, in this example, a plurality of symbols are transmitted at the same time (i.e. in the same symbol time), each symbol being transmitted on separate (i.e. independent) fibers.

Figure 5:
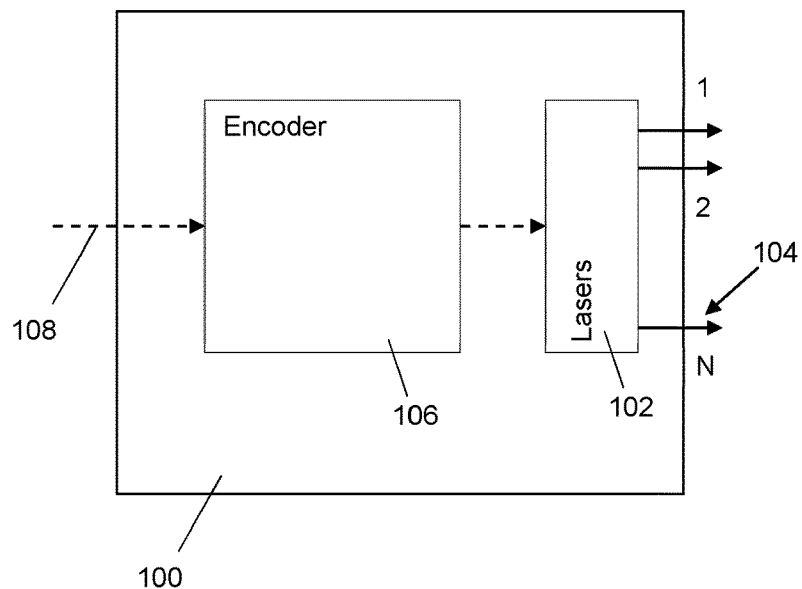
FIG. 5 is a schematic representation of an optical transmitter according to an embodiment of the disclosure.

Referring to FIG. 5, an embodiment of the disclosure provides an optical transmitter 100 comprising an optical generator configured to generate a plurality of wavelengths. For example, the optical generator is a plurality of lasers 102. The optical transmitter further comprises a plurality, N, of optical outputs 104, and an encoder 106.

Each laser is configured for generation of a transmission signal at a respective one of a plurality, M, of wavelengths. Thus, each laser generates a single wavelength. The transmission signal encodes data by Frequency Shift Keying. Thus, different wavelengths are associated with one or more different symbols, and hence one or more different sequences of data. In this example, the different frequencies of the Frequency Shift Keying modulation are generated by different lasers. Other methods for generation of the different frequencies may be used.

The encoder 106 is configured to receive a sequence of communications traffic bits 108. The encoder 106 is configured to map the sequence of communications traffic bits onto one of a plurality of transmission symbols for transmission during a symbol time.

Each transmission symbol is identified by a respective first symbol identifier and a respective second symbol identifier. For each transmission symbol, the first symbol identifier is indicative of a respective one of the plurality, M, of wavelengths at which to generate a transmission signal. The second symbol identifier is indicative of a respective one of the plurality, N, of optical outputs from which to output the transmission signal.

Figure 6:
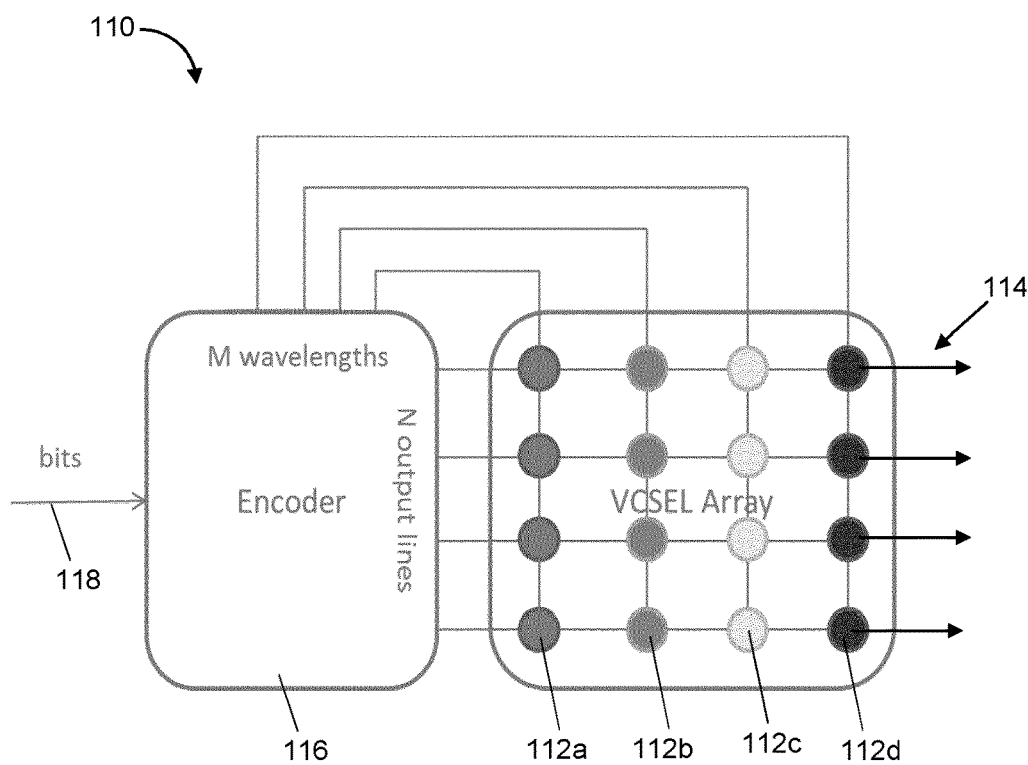
FIG. 6 is a schematic representation of an optical transmitter according to an embodiment of the disclosure.

Referring to FIGS. 6 and 7, an embodiment of the disclosure provides an optical transmitter 110 comprising an optical generator, e.g. an array of sixteen lasers 112, four optical outputs 114, and an encoder 116.

Each laser is configured for generation of a transmission signal at a respective one of four wavelengths. A respective set of four lasers 112a, 112b, 112c, 112d are coupled to each optical output 114. Each laser of each set is configured to generate a transmission signal at a respective one of a first wavelength 112a, a second wavelength 112b, a third wavelength 112c and a fourth wavelength 112d. These different wavelengths, which may lie in the infra-red part of the spectrum, are distinguished in the conventional manner, using different colour labels: blue, green, yellow and red, respectively. These colours are for description only, and do not indicate the actual wavelengths used. The lasers provide different wavelengths for generation of a symbol by Frequency Shift Keying. In some aspects, each optical output 114 (i.e. each optical fiber) may be considered as having an associated separate optical generator configured to generate all the plurality of wavelengths, e.g. the set of the plurality of lasers. Thus, there is a separate laser for each wavelength and for each output (i.e. fiber), i.e. M.N discrete lasers.

In some examples, each laser 112 is a vertical-cavity surface-emitting, VCSEL, laser. VCSELs, are power efficient and can be directly modulated up to 18 GHz modulation bandwidth. Moreover, the lasers may be arranged in an array, e.g. an array of VCSELs, all emitting at the same wavelength. Different arrays, each array emitting at a different wavelength can be integrated on a single optical chipset.

The encoder 116 is configured to receive a sequence of communications traffic bits 118, e.g. $\log_2(M.N)$ bits. In this embodiment, M=N=4, therefore the sequence comprises 4 traffic bits. The encoder is configured to encode the traffic bits (e.g. 4 bits) for transmission into each symbol time.

Each transmission symbol is identified by a respective first symbol identifier and a respective second symbol identifier. For each transmission symbol, the first symbol identifier is indicative of a respective one of the plurality, M, of wavelengths at which to generate a transmission signal. The second symbol identifier is indicative of a respective one of the plurality, N, of optical outputs from which to output the transmission signal.

The encoder 118 is configured to map the sequence of communications traffic bits onto one of M.N transmission symbols for transmission during a symbol time. In this embodiment, M=N=4, therefore there are 16 transmission symbols; each transmission signal can have one of four different wavelengths and can be output from any one of the four different optical outputs 114.

In an embodiment, referring to FIG. 6, the encoder 116 is configured to receive and store a first sequence of $\log_2(M.N)$ communications traffic bits 118 for transmission during a first symbol time. The encoder 116 is also configured to receive and store a second sequence of communications traffic bits 118 (e.g. $\log_2(M.N)$ bits) for transmission during a second symbol time, after the first symbol time. For M=N=4, each sequence comprises 4 traffic bits. The length of the bit sequence stored and processed by the encoder is 2.log 2(M.N), i.e. 8 traffic bits. This provides for transmission of a symbol indicating the bits and preparation (i.e. warm-up) for a transmission of a subsequent symbol.

The encoder 116 is configured to map the first sequence of communications traffic bits onto one of the 16 transmission symbols. The encoder 116 is also configured to determine which of the 16 transmission symbols the second sequence is to be mapped onto.

The encoder 116 is configured to generate a control signal comprising instructions to cause the respective laser to generate, during the first symbol time, the transmission signal for the transmission symbol for the first sequence of communications traffic bits.

The encoder 116 is configured to generate a control signal comprising instructions to control the current of the laser to be used to generate the transmission signal for the transmission symbol for the second sequence of communications traffic bits during the first symbol time, e.g. control the current to be higher than a transmission threshold value. The current may be a bias current of the laser. This may cause inter-symbol interference, ISI, to be introduced. However, the ISI can be either tolerated as a penalty or removed by equalization at a receiver. The encoder 116 may therefore be described as a 'partial response' encoder.

FIG. 7 illustrates the operation of the encoder 116 mapping the first sequence into a transmission symbol to be transmitted during the first symbol time and determining the laser to warm up to generate the transmission signal for the transmission symbol for the second sequence.

For each row of the table, eight input bits are received; the leading four bits are the bits of the first sequence (i.e. for transmission) and the subsequent four bits are the bits of the second sequence (i.e. for subsequent transmission).

Looking for example at the first row, each sequence consists of four zero bits. In this embodiment, the encoder 116 is configured to map a sequence 0000 to the 'blue' wavelength for transmission from the first output, represented as transmission symbol (B,1). The encoder 116 is configured to generate a control signal comprising instructions to cause the blue laser coupled to the first output to generate the transmission signal for transmission symbol (B,1) for the first sequence of communications traffic bits during the first symbol time.

The second sequence of the first row is also 0000, which the encoder is configured to again to map this bit sequence to transmission symbol (B,1). The encoder 116 is configured to generate a control signal comprising instructions to cause the current of the respective laser to be used to generate the transmission signal for the transmission symbol for the second sequence of communications traffic bits to be higher than a transmission threshold value during the first symbol time. The current of the 'blue' wavelength laser coupled to the first output will already be above its transmission threshold value during the first symbol time, since it is generating the transmission signal for the first transmission symbol.

Looking for example at the second row, the first sequence consists of 0001 and the second sequence consists of 0000. The encoder 116 is configured to map a sequence of traffic bits 0001 to the 'green' wavelength for transmission from the first output, i.e. transmission symbol (G,1). The encoder 116 is configured to generate a control signal comprising instructions to cause the 'green' wavelength laser coupled to the first output to generate the transmission signal for transmission symbol (G,1) during the first symbol time.

The encoder 116 is configured to map a sequence of traffic bits 0000 to the 'blue' wavelength for transmission from the first output, i.e. transmission symbol (B,1), therefore the encoder is able to determine that the second sequence should be mapped to transmission symbol (B,1). The encoder 116 is configured to generate a control signal comprising instructions to cause the current of the 'blue' wavelength laser coupled to the first output to be higher than its transmission threshold value during the first symbol time.

The subsequent rows of the table in FIG. 7 illustrate how each plurality of eight input bits, being a first sequence of traffic bits for transmission during a first symbol time and a second sequence of traffic bits for transmission during a second symbol time, are mapped onto respective transmission symbols and lasers to warm up are identified.

Figures 8, 9:
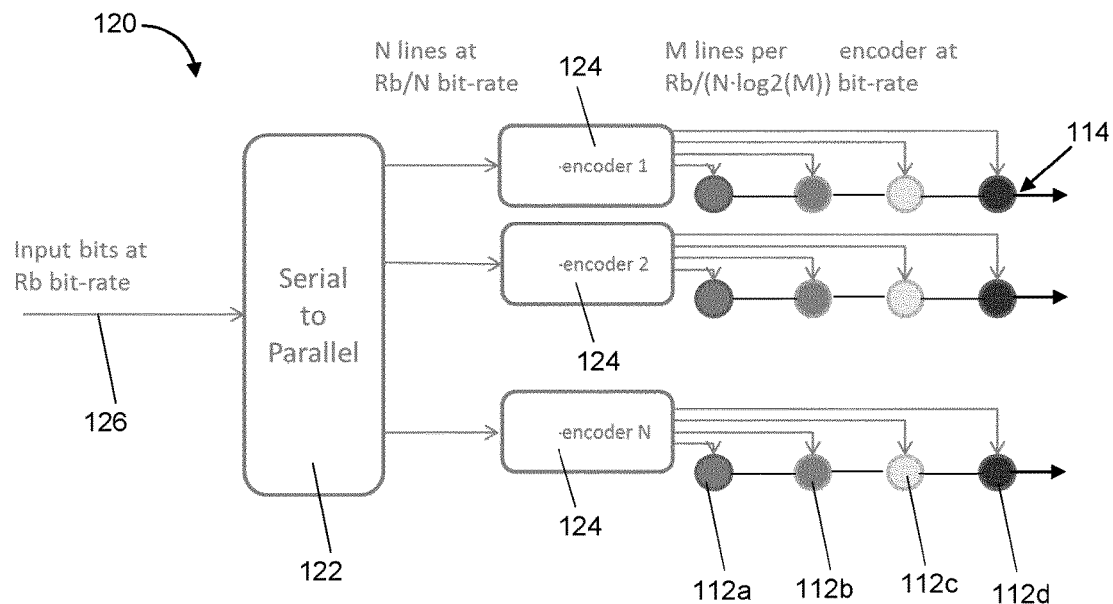
FIG. 8 is a schematic representation of an optical transmitter according to an embodiment of the disclosure.
FIG. 9 illustrates, for each encoder of the optical transmitter of FIG. 8, mapping of bits sequences into a transmission symbol for transmission during a symbol time.

Referring to FIGS. 8 and 9, an embodiment of the disclosure provides an optical transmitter 120 comprising an optical generator configured to generate a plurality of wavelengths. For example, the optical generator is a plurality, N, of arrays of lasers 112, a plurality of optical outputs 114, a serial to parallel converter 122, and a plurality, N, encoders 124. In some aspects, each optical output 114 (i.e. each optical fiber) may be considered as having an associated separate optical generator configured to generate all the plurality of wavelengths, e.g. the set or array of the plurality of lasers.

The serial to parallel converter 122 is arranged to receive input traffic bits 126 at a bit-rate Rb and to convert the input traffic bits into N lines, each at a Rb/N bit-rate. Each encoder 124 is configured to receive a respective sequence of communications traffic bits at the Rb/N bit-rate; the bit sequence consisting of $\log_2(M)$ communications traffic bits. The serial to parallel converter 122 may be considered as determining the optical fiber used, i.e. a property of the symbol, e.g. second symbol identifier.

Similarly to FIG. 6, each laser 112 is configured for generation of a transmission signal at a respective one of four wavelengths. A respective set of four lasers 112a, 112b, 112c, 112d are coupled to each optical output 114. Each laser of each set is configured to generate a transmission signal at a respective one of a first wavelength 112a, a second wavelength 112b, a third wavelength 112c and a fourth wavelength 112d. Thus, each laser generates a single wavelength.

In some examples, each laser 112 is a vertical-cavity surface-emitting, VCSEL, laser. VCSELs, are power efficient and can be directly modulated up to 18 GHz modulation bandwidth. Moreover, arrays of VCSELs can be produced, all emitting at the same wavelength. Multiple arrays, each array emitting at a different wavelength, can be integrated on a single optical chipset.

In this example, the different frequencies of the Frequency Shift Keying modulation are generated by different lasers. Other methods for generation of the different frequencies may be used.

Each encoder 124 is configured to map a respective sequence onto one of four of the transmission symbols. Each transmission symbol is identified by a respective first symbol identifier and a respective second symbol identifier. For each transmission symbol, the first symbol identifier is indicative of a respective one of the four wavelengths at which to generate a transmission signal. The second symbol identifier is indicative of a respective one of the plurality, N, of optical outputs from which to output the transmission signal. In this case, the traffic bit encoding determines the wavelength, the fiber is previously determined.

Each encoder 124 is configured to map a respective sequence of communications traffic bits onto one of M transmission symbols for transmission during a symbol time. In this embodiment, M=4, therefore there are four possible transmission symbols per line; each transmission signal can have one the four wavelengths and is output from a respective one of the four optical outputs 114.

Each encoder 124 is configured to receive a sequence of $\log_2(M)$ communications traffic bits 126. In this embodiment, M=4, therefore the sequence comprises two traffic bits.

The optical transmitter 120 can transmit $N.\log_2(M)$ traffic bits per symbol time. For four wavelengths and four optical outputs, the optical transmitter can therefore transmit eight traffic bits per symbol time.

The transmission may be considered as mapping traffic bits onto a single wavelength and a single fiber. In this case, the serial-to-parallel converter determines the fiber, and the encoder for each fiber determines the wavelength.

In a further embodiment, using 16 wavelengths and 8 output lines, which is feasible with current VCSEL and multi-core fibre technology, a bit rate 32 times higher than the line symbol rate may be achieved.

FIG. 9 illustrates the operation of each encoder 124 mapping a sequence of communications traffic bits into a transmission symbol to be transmitted during a symbol time.

Each row of the table illustrates one of four possible sequences of communications traffic bits; each sequence consists of two traffic bits.

Looking for example at the first row, the sequence consists of two zero bits. In this embodiment, each encoder 124 is configured to map a sequence 00 to the 'blue' (B) wavelength for transmission from its respective output. Each encoder 124 is configured to generate a control signal comprising instructions to cause its 'blue' laser to generate the transmission signal for the transmission symbol for this sequence of communications traffic bits.

Looking at the second row, the sequence consists of traffic bits 01. Each encoder 124 is configured to map a sequence of traffic bits 01 to the 'green' (G) wavelength for transmission from its respective output. Each encoder 124 is configured to generate a control signal comprising instructions to cause its 'green' laser to generate the transmission signal for the transmission symbol for this sequence of bits.

As illustrated in the next two rows of the table in FIG. 9, a sequence of traffic bits 10 is mapped to the 'yellow' wavelength and traffic bits 11 are mapped to the 'red' wavelength.

In an embodiment, referring to FIGS. 8 and 10, each encoder 124 is configured to receive and store a first sequence of $\log_2(M)$ of communications traffic bits 126 for transmission during a first symbol time. Each encoder 124 is also configured to receive and store a second sequence of $\log_2(M)$ communications traffic bits 126 for transmission during a second symbol time, after the first symbol time. M=4, therefore each sequence comprises two traffic bits. The length of the bit sequence stored and processed by the encoder is $2.\log 2(M)$, i.e. four traffic bits.

Each encoder 124 is configured to map the first sequence of communications traffic bits onto one of the respective set of four transmission symbols. Each encoder 124 is also configured to determine which of the respective set of four transmission symbols the second sequence is to be mapped onto.

Each encoder 124 is configured to generate a control signal comprising instructions to cause the respective laser, labelled B, G, Y or R, to generate, during the first symbol time, the transmission signal for the transmission symbol for the first sequence of communications traffic bits.

Each encoder 124 is configured to generate a control signal comprising instructions to cause the current of the laser to be used to generate the transmission signal for the transmission symbol for the second sequence of communications traffic bits to be higher than a transmission threshold value during the first symbol time, to 'warm-up' the laser for transmission during the second symbol time; this is represented by a in FIG. 10, which is the ratio between the nominal transmission power and a warm-up power level. This may cause inter-symbol interference, ISI, to be introduced. However, the ISI can be either tolerated as a penalty or removed by equalization at a receiver. Each encoder 124 may therefore be described as a 'partial response' encoder.

Any of the above described optical transmitters 100, 120 may be implemented as an integrated photonic optical transmitter with the lasers integrated on a single optical chip.

In an embodiment, the sequence of communications traffic bits consists of $\log_2(M.N)$ communications traffic bits. The plurality of transmission symbols consists of M.N transmission symbols. By performing simultaneous space- and wavelength-division multiplexing the optical transmitter may enable $\log_2(M.N)$ communications traffic bits to be transmitted per symbol time.

In an embodiment, the optical transmitter comprises a plurality, N, of encoders. Each encoder is configured to receive a respective sequence of communications traffic bits consisting of $\log_2(M)$ communications traffic bits. Each encoder is configured to map the respective sequence of communications traffic bits onto one of a respective plurality, M, of the transmission symbols. Each of the plurality, N, of optical outputs is coupled to a plurality, M, of the lasers. Each laser is configured for generation of a transmission signal at a respective one of the plurality, M, of wavelengths. Providing N encoders may enable each encoder to map traffic bit sequences comprising fewer traffic bits onto transmission symbols while enabling the optical transmitter to transmit $N.\log_2(M)$ communications traffic bits per symbol time. Requiring each encoder to map fewer traffic bits may simplify operation of each encoder and reduce processing time to map a sequence.

In an embodiment, each encoder is configured to receive a first sequence of communications traffic bits for transmission during a first symbol time and to receive a second sequence of communications traffic bits for transmission during a second symbol time, after the first symbol time. Each encoder is configured to map the first sequence of communications traffic bits onto one of the respective plurality of transmission symbols. Each encoder is configured to determine one of the respective plurality of transmission symbols that the second sequence of communications traffic bits is to be mapped onto. Each encoder is configured to generate at least one control signal comprising instructions to cause the respective laser to generate the transmission signal for the transmission symbol for the first sequence of communications traffic bits during the first symbol time. Each encoder is configured to cause the current of the respective laser to be used to generate the transmission signal for the transmission symbol for the second sequence of communications traffic bits to be higher than a transmission threshold value during the first symbol time.

By receiving both the traffic bits for transmission during a current symbol time and the traffic bits for transmission during a subsequent symbol time it is possible to know in advance what symbol will be transmitted during the subsequent symbol time. The optical transmitter may therefore forecast which wavelength will be required for the subsequent transmission symbol which may enable the current of the corresponding laser to be turned on in advance, to above its transmission threshold, significantly decreasing the pulse rise time and increasing the achievable transmission speed.

In an embodiment, each laser is a vertical-cavity surface-emitting laser, VCSEL.

In an embodiment, each encoder is a partial-response encoder. By introducing a known amount of inter-symbol interference, ISI, the turn on time of each laser may be reduced. The ISI may be tolerated as a penalty or may be removed by equalization at a receiver.

In an embodiment, each encoder is configured to receive and store each sequence of communications traffic bits. By receiving and storing both the traffic bits for transmission during a current symbol time and the traffic bits for transmission during a subsequent symbol time it is possible to know in advance what symbol will be transmitted during the subsequent symbol time. The optical transmitter may therefore forecast which wavelength will be required for the subsequent transmission symbol which may enable the current of the corresponding laser to be turned on in advance, to above its transmission threshold, significantly decreasing the pulse rise time and increasing the achievable transmission speed.

Each encoder may be implemented as one or more processors, hardware, processing hardware or circuitry.

The optical transmitter may perform simultaneous space- and wavelength-division multiplexing to provide an energy efficient modulation format to achieve high transmission speed with simple electronic post processing. References to processors, hardware, processing hardware or circuitry can encompass any kind of logic or analog circuitry, integrated to any degree, and not limited to general purpose processors, digital signal processors, ASICs, FPGAs, discrete components or logic and so on. References to a processor are intended to encompass implementations using multiple processors which may be integrated together, or co-located in the same node or distributed at different locations for example.

Figure 11:
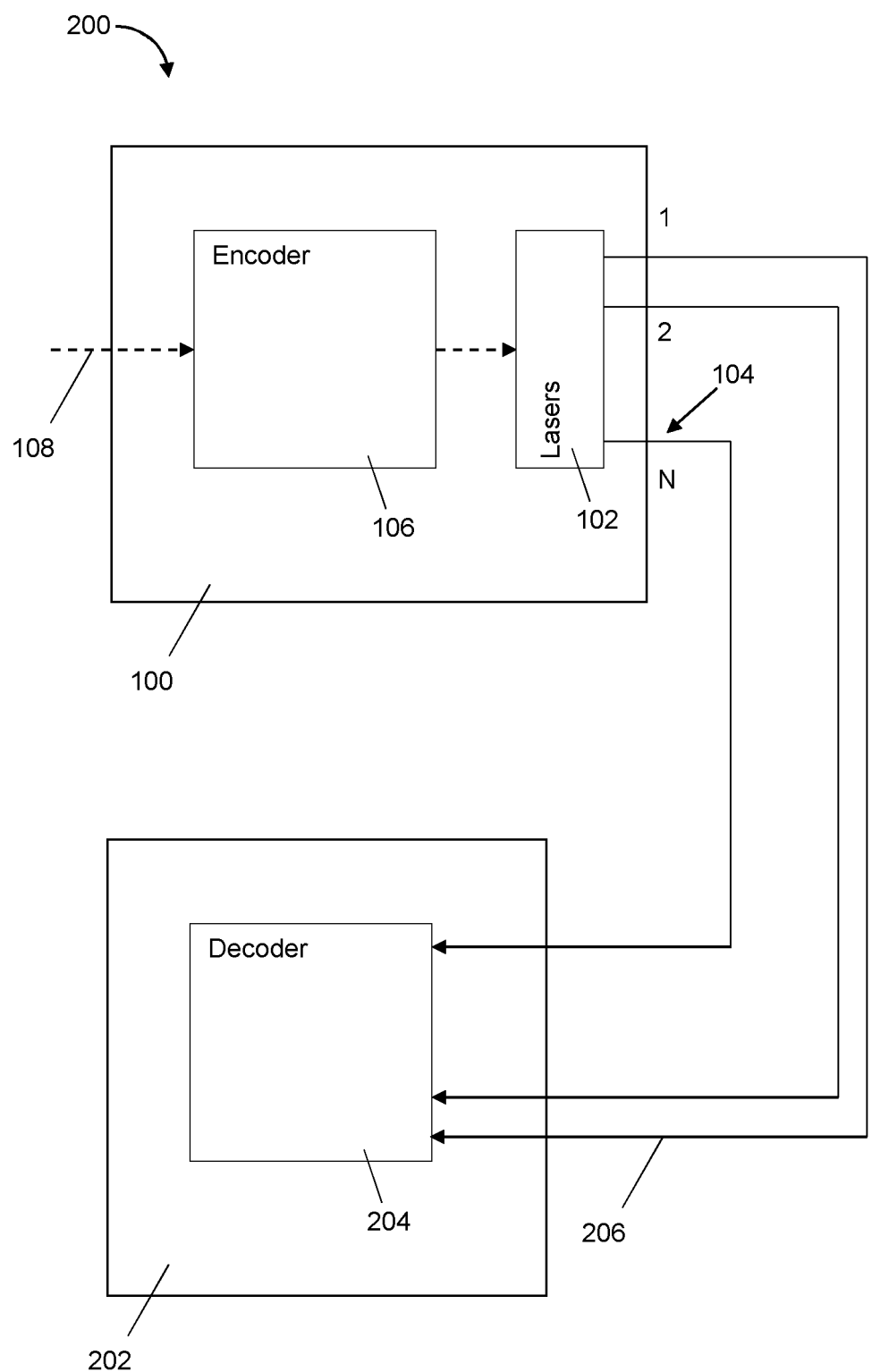
FIG. 11 is a schematic representation of an optical transmission system according to an embodiment of the disclosure.

Referring to FIG. 11, an embodiment of the disclosure provides an optical communications transmission system 200 comprising an optical transmitter 100 as described above, an optical receiver 202 and a plurality, N, of optical fibres 206.

Each fibre is coupled between a respective one of the optical outputs of the optical transmitter and the optical receiver.

The optical receiver comprises a decoder 204 configured to receive each transmission symbol transmitted by the optical transmitter.

In an embodiment, step a. comprises receiving a first sequence of communications traffic bits for transmission during a first symbol time and receiving a second sequence of communications traffic bits for transmission during a second symbol time, after the first symbol time. Step b. comprises mapping the first sequence of communications traffic bits onto one of the plurality of transmission symbols. Step b. also comprises determining one of the plurality of transmission symbols that the second sequence of communications traffic bits is to be mapped onto. The method further comprises step c. of, during the first symbol time, transmitting the transmission symbol for the first sequence of communications traffic bits and controlling a current of a laser configured for generation of a transmission signal at the respective wavelength of the transmission symbol for the second sequence of communications traffic bits. The current of the laser is controlled to be higher than a transmission threshold value. By receiving both the traffic bits for transmission during a current symbol time and the traffic bits for transmission during a subsequent symbol time it is possible to know in advance what symbol will be transmitted during the subsequent symbol time. The method may therefore forecast which wavelength will be required for the subsequent transmission symbol which may enable the current of the corresponding laser to be turned on in advance, to above its transmission threshold, significantly decreasing the pulse rise time and increasing the achievable transmission speed.

In an embodiment, step a. additionally comprises storing each received sequence of communications traffic bits. By receiving and storing both the traffic bits for transmission during a current symbol time and the traffic bits for transmission during a subsequent symbol time it is possible to know in advance what symbol will be transmitted during the subsequent symbol time. The method may therefore forecast which wavelength will be required for the subsequent transmission symbol which may enable the current of the corresponding laser to be turned on in advance, to above its transmission threshold, significantly decreasing the pulse rise time and increasing the achievable transmission speed.

It will be appreciated that the optical communications transmission system 200 may comprise any of the optical transmitters 100, 120 described above. An aspect of the disclosure may provide the receiver described above, independently of the transmitter.

In an embodiment, the sequence of communications traffic bits consists of $\log_2(M.N)$ communications traffic bits. The plurality of transmission symbols consists of M.N transmission symbols. By performing simultaneous space- and wavelength-division multiplexing $\log_2(M.N)$ communications traffic bits may be transmitted within the transmission system per symbol time.

In an embodiment, the optical transmitter comprises a plurality, N, of encoders. Each encoder is configured to receive a respective sequence of communications traffic bits consisting of $\log_2(M)$ communications traffic bits. Each encoder is configured to map the respective sequence of communications traffic bits onto one of a respective plurality, M, of the transmission symbols. Each of the plurality, N, of optical outputs is coupled to a plurality, M, of the lasers. Each laser is configured for generation of a transmission signal at a respective one of the plurality, M, of wavelengths. Providing N encoders may enable each encoder to map traffic bit sequences comprising fewer traffic bits onto transmission symbols while enabling $N.\log_2(M)$ communications traffic bits be transmitted within the transmission system per symbol time. Requiring each encoder to map fewer traffic bits may simplify operation of each encoder and reduce processing time to map a sequence.

In an embodiment, each encoder is configured to receive a first sequence of communications traffic bits for transmission during a first symbol time and to receive a second sequence of communications traffic bits for transmission during a second symbol time, after the first symbol time. Each encoder is configured to map the first sequence of communications traffic bits onto one of the respective plurality of transmission symbols. Each encoder is configured to determine one of the respective plurality of transmission symbols that the second sequence of communications traffic bits is to be mapped onto. Each encoder is configured to generate at least one control signal comprising instructions to cause the respective laser to generate the transmission signal for the transmission symbol for the first sequence of communications traffic bits during the first symbol time.

By receiving both the traffic bits for transmission during a current symbol time and the traffic bits for transmission during a subsequent symbol time it is possible to know in advance what symbol will be transmitted during the subsequent symbol time. The optical transmitter may therefore forecast which wavelength will be required for the subsequent transmission symbol which may enable the current of the corresponding laser to be turned on in advance, to above its transmission threshold, significantly decreasing the pulse rise time and increasing the achievable transmission speed within the transmission system.

In an embodiment, each encoder is a partial-response encoder. By introducing a known amount of inter-symbol interference, ISI, the turn on time of each laser may be reduced. The ISI may be tolerated as a penalty within the transmission system or may be removed by equalization at the optical receiver.

In an embodiment, each encoder is configured to receive and store each sequence of communications traffic bits. By receiving and storing both the traffic bits for transmission during a current symbol time and the traffic bits for transmission during a subsequent symbol time it is possible to know in advance what symbol will be transmitted during the subsequent symbol time. The optical transmitter may therefore forecast which wavelength will be required for the subsequent transmission symbol which may enable the current of the corresponding laser to be turned on in advance, to above its transmission threshold, significantly decreasing the pulse rise time and increasing the achievable transmission speed within the transmission system.

Each encoder may be implemented as one or more processors, hardware, processing hardware or circuitry.

References to processors, hardware, processing hardware or circuitry can encompass any kind of logic or analog circuitry, integrated to any degree, and not limited to general purpose processors, digital signal processors, ASICs, FPGAs, discrete components or logic and so on. References to a processor are intended to encompass implementations using multiple processors which may be integrated together, or co-located in the same node or distributed at different locations for example.

The examples above describe a transmission symbol identified using only one wavelength. In a further example, the symbol is identified using one or more wavelength transmitted on the same fiber. In some examples, a symbol is identified by a plurality of wavelengths transmitted simultaneously. The plurality of wavelengths may be transmitted by a respective plurality of lasers. The combination of different wavelengths indicates a different symbol, e.g. different data bits, than the symbol or data associated with the individual wavelengths. For example, a transmission of blue and green together indicates a further symbol, separate to the transmission of blue or green wavelengths. The use of more symbols may allow higher rate of transmission of traffic bits.

The examples above describe a transmission symbol identified using only one fiber to indicate a symbol. In a further example, the symbol may be identified using one or more fibers. For example, the presence of a transmission on a predetermined combination of fibres can be used to indicate further symbols. Thus, a transmission on a plurality of fibres simultaneously may be identified as a single symbol, encoding a single sequence of communications data bits. The second symbol identifier is therefore the one or more fibers on which the wavelength is transmitted.

For example, a transmission on a first fiber and on a second fiber indicates a further symbol. Thus, a symbol property (symbol identifier) is the identity of one or more fibers on which the transmission is made.

The transmission of a symbol identified by more than one wavelength may be combined with identification by more than one fiber. Thus, a symbol may be identified or characterized by one or more wavelength and one or more fiber carrying the wavelength(s).

A further embodiment of the disclosure provides a computer program comprising instructions which, when executed on at least one processor, cause the at least one processor to carry out any of the steps of the method 10, 20, 40, 50 of transmitting communications traffic described in any of the above embodiments.

A further embodiment of the disclosure provides a carrier containing the computer program of the previous embodiment. The carrier is one of an electronic signal, optical signal, radio signal, or computer readable storage medium.

The invention claimed is:

1. A method of transmitting communications traffic, the method comprising steps:
   a. receiving a sequence of communications traffic bits, said receiving comprising receiving a first sequence of communications traffic bits for transmission during a first symbol time and receiving a second sequence of communications traffic bits for transmission during a second symbol time, after the first symbol time; and
   b. mapping the sequence of communications traffic bits onto a respective one of a plurality of transmission symbols for transmission during a symbol time, wherein each transmission symbol is identified by a respective first symbol identifier indicative of a respective one or more of a plurality, M, of wavelengths for a transmission signal and a respective second symbol identifier indicative of a respective one or more of a plurality, N, of optical fibres on which to transmit the transmission signal, said mapping comprising mapping the first sequence of communications traffic bits onto one of the plurality of transmission symbols and determining one of the plurality of transmission symbols that the second sequence of communications traffic bits is to be mapped onto thereby determining the one of the plurality of transmission symbols that the second sequence of communications traffic bits is to be mapped onto in advance of the second symbol time; and
   c. during the first symbol time, transmitting the transmission symbol for the first sequence of communications traffic bits and preparing a laser for generation of a transmission signal at the respective wavelength of the transmission symbol for the second sequence of communications traffic bits,
   wherein the preparing the laser comprises controlling a current of a laser, configured for generation of a transmission signal at the respective wavelength of the transmission symbol for the second sequence of communications traffic bits, to be higher than a transmission threshold value thereby preparing the laser in advance of the second symbol time.

2. The method as claimed in claim 1, wherein each of the transmission symbols is for a separate optical fiber.

3. The method as claimed in claim 1 wherein the sequence of communications traffic bits directly determines the wavelength and optical fiber of the transmission symbol.

4. The method as claimed in claim 1 wherein the plurality of transmission symbols consists of M.N transmission symbols.

5. The method as claimed in claim 1 wherein the transmission symbol is based on Frequency Shift Keying.

6. An optical transmitter comprising:
an optical generator configured for generation of a transmission signal at a respective one of a plurality, M, of wavelengths;
a plurality, N, of optical outputs; and
an encoder configured to receive a sequence of communications traffic bits and configured to map the sequence of communications traffic bits onto one of a plurality of transmission symbols for transmission during a symbol time, wherein each transmission symbol is identified by a respective first symbol identifier indicative of a respective one or more of the plurality, M, of wavelengths at which to generate a transmission signal and a respective second symbol identifier indicative of a respective one or more of the plurality, N, of optical outputs from which to output the transmission signal,
wherein the encoder is configured to receive a first sequence of communications traffic bits for transmission during a first symbol time and to receive a second sequence of communications traffic bits for transmission during a second symbol time, after the first symbol time;
wherein the encoder is further configured to map the first sequence of communications traffic bits onto one of the respective plurality of transmission symbols;
wherein the encoder is further configured to determine one of the respective plurality of transmission symbols that the second sequence of communications traffic bits is to be mapped onto to thereby determine the one of the plurality of transmission symbols that the second sequence of communications traffic bits is to be mapped onto in advance of the second symbol time; and
wherein the encoder is further configured to generate at least one control signal comprising instructions to generate the transmission signal for the transmission symbol for the first sequence of communications traffic bits during the first symbol time and to prepare a laser to be used to generate the transmission signal for the transmission symbol for the second sequence of communications traffic during the first symbol time;
wherein the encoder is further configured to prepare the laser by controlling a current of a laser, configured for generation of a transmission signal at the respective wavelength of the transmission symbol for the second sequence of communications traffic bits, to be higher than a transmission threshold value thereby preparing the laser in advance of the second symbol time.

7. The optical transmitter as claimed in claim 6 wherein the optical generator comprises a plurality of lasers each configured for generation of the transmission signal at the respective one of a plurality, M, of wavelengths.

8. The optical transmitter as claimed in claim 6, wherein:
the optical transmitter comprises a plurality, N, of encoders, each encoder being configured to receive a respective sequence of communications traffic bits, and each encoder being configured to map the respective sequence of communications traffic bits onto one of a respective plurality, M, of the transmission symbols; and
each of the plurality, N, of optical outputs is coupled to an optical generator, each optical generator being configured for generation of a transmission signal at a respective one of the plurality, M, of wavelengths.

9. The optical transmitter as claimed in claim 6 wherein the encoder is configured to directly determine the wavelength and optical fiber of the transmission symbol for each different sequence of communications traffic bits.

10. The optical transmitter as claimed in claim 6, wherein the plurality of transmission symbols consists of M.N transmission symbols.

11. An optical communications transmission system comprising:
an optical transmitter as claimed in claim 6;
an optical receiver comprising a decoder configured to receive each said transmission symbol; and
a plurality, N, of optical fibres, each fibre being coupled between a respective one of the optical outputs of the optical transmitter and the optical receiver.

12. A computer program comprising instructions which, when executed on at least one processor, cause the at least one processor to carry out the method according to claim 1.

* * * * *